May 6, 1941.　　　　E. E. PICKARD　　　　2,241,218
LINING FOR BRAKES AND THE LIKE
Original Filed April 6, 1936
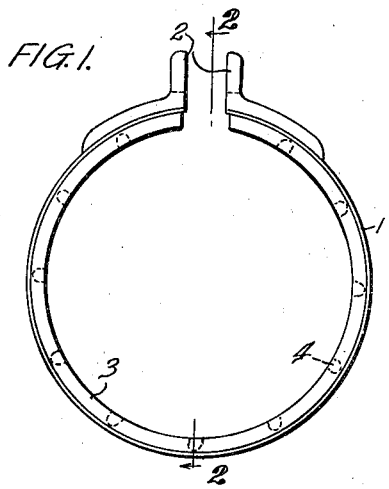
FIG. 1.
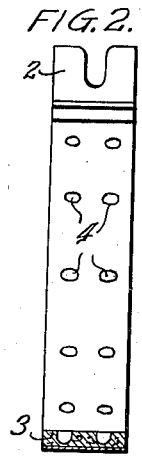
FIG. 2.
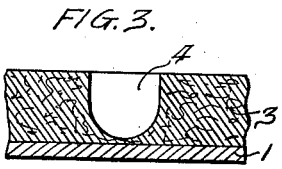
FIG. 3.
FIG. 4.
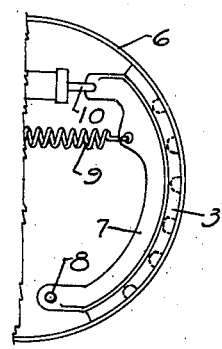
FIG. 5
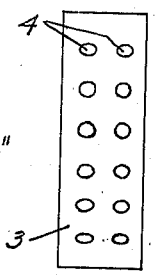
FIG. 6
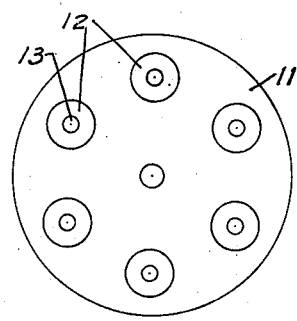
FIG. 7
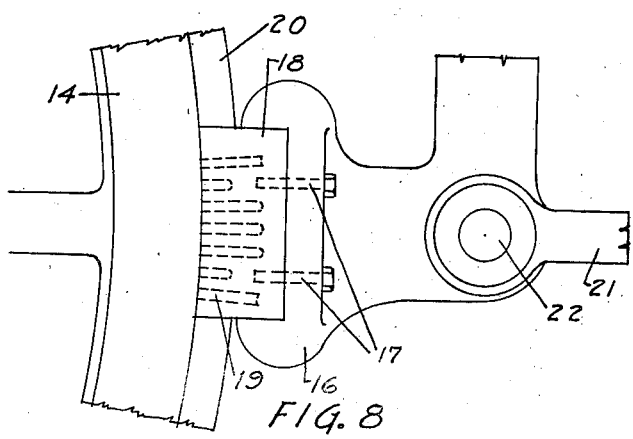
FIG. 8
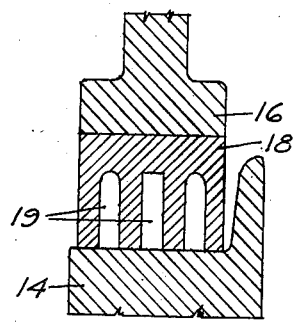
FIG. 9
EUGENE E. PICKARD
INVENTOR
BY Carmack Waterhouse
ATTORNEY Patented May 6, 1941

2,241,218

UNITED STATES PATENT OFFICE 2,241,218

LINING FOR BRAKES AND THE LIKE

Eugene E. Pickard, Cleveland, Tenn.

Substitute for abandoned application Serial No. 72,987, April 6, 1936. This application September 19, 1940, Serial No. 357,445

4 Claims. (Cl. 188—261)

My invention relates to brakes, and more particularly to linings for brakes for automobiles and the like.

This application is a substitute for application No. 72,987, filed April 6, 1936.

In the prior art it is common practice to employ a brake drum, closely associated with the wheels or shafts of automobiles, vehicles, or other devices to be stopped. In this construction the drum is surrounded or partially surrounded by a plurality of brake shoes, and separated by a lining secured to the shoes, or the drum encircles the brake shoes, and forces the lining into intimate frictional engagement with the surface of the drum, to retard and finally prevent rotation of such drum, thereby stopping the particular device.

In the above constructions, one of the things which has been a source of inconvenience and trouble, is in the operation of causing the shoe or lining to take hold of the drum and prevent relative movement. Modern means for placing great force on the shoe have been devised for bringing the lining against the drum and increase the friction to retard relative movement. Considerable force for such an extended time must be placed on the brake actuating lever to accomplish this desired result. The continued compression of this lining for long periods, permanently deforms it, and squeezes it out along the sides of the shoe, materially reducing the thickness and reducing the useful life.

Many other problems have arisen in the art of brakes and brake bands. Difficulty has often been encountered in selecting a lining of suitable composition to provide the requisite frictional qualities, while offering a long life and immunity from the effects of heat. In one case cork has been selected as most desirable because of its usefulness under conditions of excess oil. Cory, 1,286,171 suggests such a band or lining, and provides recesses, joined by grooves to a central oil supply for cooling the band for insuring long life. Another instance arose where heat of the drum, due to brake action, caused it to expand and alter its shape and proportions with respect to the brake shoe and lining, thereby altering the conditions of operation, so that the shoe and lining no longer seat properly in or on the drum reducing usefulness. Loughead, 1,923,872 has attempted a solution of this problem by forming openings through the lining for heat communication between the shoe and the drum, in order that the same relative temperatures may be maintained and the shoe caused to expand with the drum, thereby preserving the relative proportions.

While it is seen that openings, grooves and recesses have been formed in brake shoes and linings for various purposes, they do not employ means for increasing the traction between the brake shoe or lining and the drum by employing recesses in either the shoe or the lining.

Applicant with a knowledge of the defects in and objections to the prior art has for an object of his invention the provision of recesses or apertures in the lining of brakes which increase the adherence between the surface of the lining and the drum when the shoe clamps it around the drum by forcing the air from the recesses and creating vacuum cups.

It is a further object of my invention to dispense with the necessity for placing a great force on the band and lining for an extended period, by the provision of vacuum cups in the face of the brake lining, which increases the adherence to the drum thereby reducing the pressure necessary for continued operation.

It is a still further object of my invention to provide a brake lining which eliminates the necessity for employing great compression over a sustained period, thereby preserving the form and texture of the lining and increasing its useful life.

It is a still further object of my invention to provide a brake which will adhere more closely to the braking surface, and which will act more quickly and efficiently to retard relative movement.

It is a still further object of my invention to provide such recesses for clutches to increase their frictional engagement, thereby preventing slipping.

Other objects and advantages of my invention will appear in the following specification, and the novel features will be particularly pointed out in the annexed claims.

In the drawing Figure 1 shows a side elevation of a brake or clutch shoe or band employing my improved invention. Figure 2 is a cross-section of the shoe or band of Figure 1 taken through the line 2—2. Figure 3 is a cross-section of a section of one form of my invention. Figure 4 is a cross-section of a section showing another form of my invention. Figure 5 is a side elevation of another form of brake. Figure 6 is a plan view of the lining of Figure 5. Figure 7 is a clutch using my invention. Figure 8 is a side elevation of a brake for a locomotive. And Figure 9 is a cross-section of a portion of Figure 8 showing my improved brake.

With reference to the details of the drawing and with particular reference to Figures 1 and 2, 1 designates a brake or clutch shoe or band adapted to encircle and contract about a drum for retarding or preventing relative movement therebetween. 2 represents ears on the band or shoe for contracting it, and 3 indicates a lining interposed between the band or shoe and the drum, and secured to such shoe by appropriate means such as rivets in a conventional manner. The inner face of the lining 3 having recesses or grooves formed therein.

Figures 3 and 4 show two modifications of such linings. In Figure 3 the lining 3 which is generally fabric, contains recesses 4 extending only partially through the thickness of the lining to form air pockets or cups. In the modification of Figure 4 the pocket or cup 4' in the lining 3' extends entirely through, but leakage is prevented by using cement or a sealing medium 5' to tightly secure the lining 3' to the band or shoe 1'.

In operation pressure is applied to the brake or clutch lever, resulting in the movement of ears 2 towards each other and the contracting of band or shoe 1 about the drum. The impact of the lining 3 with the drum compresses it and forces the air out of pockets or recesses 4, creating a vacuum as the band and lining tend to restore themselves after impact. This causes close adherence between the lining and the drum and results in stopping the drum very quickly. Although a great deal of the force may be removed from the brake lever the lining will remain in close relation with the drum and retain its effectiveness because of the influence of the vacuum cups. In this way the form and texture of the band are maintained and the usefulness and life greatly increased. When sufficient pressure is removed from the brake lever, a spring acts to expand the brake band and remove braking action.

Figure 5 shows a modified form of brake, in which the brake shoe is made in sections and expands outwardly against the inner face of the drum. Only one shoe is shown, and 6 indicates a drum, 7 a shoe pivoted at one end at 8 and moved outwardly against the drum by lever 10. 9 designates a spring for releasing the shoe from operative position. Interposed between the drum and face of the shoe, and secured to the latter is a lining 3''. Recesses or openings of the character previously described are formed in the drum engaging face of such lining.

The operation of this modification is very much similar to the one disclosed in Figure 1, except that the actuation of the brake lever causes lever 10 to swing shoe 7 about pivot 8 and force lining 3'' into engagement with the drum. The impact compresses the lining 3'', exhausts the air from the pockets 4'' and retains the lining in close engagement with drum 6 retarding all relative movement between drum 6 and lining 3''.

Removal of the force through lever 10 leaves the spring free to break the vacuum and restore the shoe to disengaged position.

Figure 7 discloses a clutch embodying my invention. 11 designates a disc into whose driving face is seated inserts 12 of fabric, cork, or other material for making good frictional contact with a like disc for driving. In the face of each insert is formed one or more pockets 13.

In operation impact of disc 11 with its corresponding disc compresses inserts 12 and exhausts the air from pockets 13 so that the tendency of the inserts to restore to normal shape creates a vacuum in the pockets and maintains the two discs in tight frictional engagement.

Figure 8 shows my invention applied to a locomotive, passenger, freight, street car, etc. in which 14 designates the rim of a wheel, and 20 the flange. 18 is a brake shoe of hard or soft metal or a mixture in reinforced form. 16 represents a housing to which shoe 18 is secured by bolts 17. Recesses 19 are formed in the face of the shoe which engages the rim 14 of the wheel. Actuated lever 21 is pivoted to housing 16 by the pivot 22.

In operation shoe 18 is brought into engagement with the rim 14 of the wheel. The impact slightly compresses the resilient metal of shoe 18 creating a vacuum in pockets 19 as the shoe tends to restore itself. This causes the shoe to tightly adhere to the surface of the rim 14 retarding relative movement therebetween. This reduces the pressure required to maintain the shoe in tight frictional engagement with the rim 14.

Part of the recesses 19 have a tapered bottom and others have a flat one. This is also true of the other figures and their pockets.

Having thus described my invention, I claim:

1. In a brake of the character described, a brake shoe having a drum engaging face, a yieldable lining covering said face and having openings extending therethrough, and means for sealing said lining to said shoe against ingress of air, said openings cooperating with the brake drum to create suction between the lining and said drum to retard relative movement therebetween.

2. In a brake of the character described, comprising a brake drum, a brake shoe having a surface opposing the drum, a pivotal support for said brake shoe located adjacent one end thereof, a yieldable lining interposed between said brake shoe and said drum, said lining having openings extending therethrough, and means sealing the lining to said brake shoe, whereby impact with said drum exhausts the air therefrom and creates suction between said lining and drum, thereby retarding relative movement.

3. In a brake of the character described, comprising a brake drum, a brake shoe having a face opposing the drum, a pivot support for said brake shoe located adjacent one end thereof, a fabric lining interposed between said brake shoe and said drum, means acting on the free end of said shoe for pressing said lining against said drum, openings extending through said lining, and means sealing said lining to said brake shoe to retard relative movement between said drum and shoe and means for disengaging said lining from said drum.

4. In a brake of the character described comprising a brake drum, a brake shoe having a face opposing the drum, a pivotal support for said brake shoe located adjacent one end thereof, a yieldable lining interposed between said brake shoe and said drum, means acting on the free end of said shoe for pressing said lining against said drum, openings extending therethrough, and means sealing the lining to said brake shoe, whereby impact with said drum exhausts the air therefrom and creates suction between said lining and drum, thereby retarding relative movement, and means for disengaging said lining from said drum.

EUGENE E. PICKARD.